(12) United States Patent
Su et al.

(10) Patent No.: US 10,542,551 B2
(45) Date of Patent: Jan. 21, 2020

(54) NARROW BAND AWARENESS FOR IN-DEVICE COEXISTENCE

(71) Applicant: Apple Inc., Cupertino, CA (US)

(72) Inventors: Li Su, San Jose, CA (US); Yang Li, Plano, TX (US); Zhu Ji, San Jose, CA (US)

(73) Assignee: Apple Inc., Cupertino, CA (US)

( * ) Notice: Subject to any disclaimer, the term of this patent is extended or adjusted under 35 U.S.C. 154(b) by 25 days.

(21) Appl. No.: 15/941,073

(22) Filed: Mar. 30, 2018

(65) Prior Publication Data

US 2018/0359760 A1  Dec. 13, 2018

Related U.S. Application Data

(60) Provisional application No. 62/517,730, filed on Jun. 9, 2017.

(51) Int. Cl.
| | |
|---|---|
| *H04W 72/08* | (2009.01) |
| *H04B 1/715* | (2011.01) |
| *H04W 72/04* | (2009.01) |
| *H04W 72/12* | (2009.01) |

(52) U.S. Cl.
CPC ......... *H04W 72/082* (2013.01); *H04B 1/715* (2013.01); *H04W 72/0453* (2013.01); *H04W 72/1215* (2013.01)

(58) Field of Classification Search
CPC ............................ H04W 72/082; H04B 1/713
See application file for complete search history.

(56) References Cited

U.S. PATENT DOCUMENTS

| | | | | |
|---|---|---|---|---|
| 2011/0053597 | A1* | 3/2011 | Lee | H04W 36/22 |
| | | | | 455/436 |
| 2014/0200002 | A1* | 7/2014 | Vangala | H04W 24/10 |
| | | | | 455/436 |
| 2014/0313910 | A1 | 10/2014 | Appleton | |
| 2016/0174280 | A1 | 6/2016 | Singh et al. | |
| 2016/0338071 | A1 | 11/2016 | Khosla et al. | |
| 2017/0272955 | A1 | 9/2017 | Sadek et al. | |
| 2018/0049080 | A1* | 2/2018 | Zhang | H04W 4/70 |

FOREIGN PATENT DOCUMENTS

WO   WO 2017/019133 A1   2/2017

* cited by examiner

*Primary Examiner* — Samina F Choudhry
(74) *Attorney, Agent, or Firm* — Kowert Hood Munyon Rankin and Goetzel PC; Jeffrey C. Hood; Luke S. Langsjoen

(57) ABSTRACT

This disclosure relates to techniques for wireless devices to improve wireless communication technology coexistence characteristics using narrow band use awareness in a wireless communication system. A wireless device may attach to a serving cell according to a first radio access technology. A frequency range in active use by the wireless device for communication according to the first radio access technology may be determined. The frequency range may include less bandwidth than the system bandwidth of the serving cell. An indication of the frequency range may be provided from a portion of the wireless device implementing the first radio access technology to a portion of the wireless device implementing a second radio access technology. It may be determined whether to modify operation of the wireless device with respect to the second radio access technology based at least in part on the indication of the frequency range.

20 Claims, 6 Drawing Sheets

NARROW BAND AWARENESS FOR IN-DEVICE COEXISTENCE

PRIORITY INFORMATION

This application claims priority to U.S. provisional patent application Ser. No. 62/517,730, entitled "Narrow Band Awareness for In-Device Coexistence," filed Jun. 9, 2017, which is hereby incorporated by reference in its entirety as though fully and completely set forth herein.

FIELD

This disclosure relates to wireless communication, including to techniques for a wireless device to improve wireless communication technology coexistence characteristics using narrow band use awareness in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content. In many instances, a wireless device may implement multiple wireless communication technologies. This can lead to potential interference problems, for example if communication by one or more wireless communication technologies interferes with communication by another wireless communication technology operating in the same or a nearby frequency band.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". Many such devices have relatively limited wireless communications capabilities and typically have smaller batteries than larger portable devices, such as smart phones and tablets. In general, it would be desirable to recognize and provide support for the relatively limited wireless communication capabilities of such devices. Therefore, improvements in the field are desired.

SUMMARY

Embodiments are presented herein of, inter alia, systems, apparatuses, and methods for a wireless device to improve wireless communication technology coexistence characteristics using narrow band use awareness in a wireless communication system.

According to the techniques described herein, a wireless device may implement multiple radio access technologies (RATs), such that at least on some occasions it may be possible that communication by one could have an impact (e.g., cause interference to) the other. Whether or not a transmission according to one RAT impacts another RAT may depend on any number of factors, among which one may include the frequency ranges in use by each RAT.

It may accordingly be useful for a RAT implemented by a wireless device to be aware of the frequency ranges in use by other RATs implemented by the wireless device, e.g., in order to improve the ability of the RAT to mitigate any potential interference or other impact that might be caused by the other RAT, or that the RAT might cause to the other RAT.

However, such mitigation actions may have a cost, e.g., in terms of throughput, resource usage, power consumption, and/or any of various other possible considerations. For example, if a communication that might cause interference to another RAT is delayed or cancelled to mitigate the potential interference, data throughput according to that RAT may be reduced, and/or time/frequency resources reserved for the communication may go to waste. Accordingly, it may be beneficial to avoid taking such mitigation actions when not actually needed to avoid intereference between RATs.

As one possibility for more precisely determining when inter-RAT interference may occur, techniques are disclosed herein for determining the frequency range in active use by a RAT in a wireless device in a relatively finely-grained manner, and disclosing such a more precisely determined frequency range to one or more RATs co-existing in the wireless device. Such techniques may be particularly useful in scenarios in which the wireless device may commonly actively use only a relatively small portion of the total system bandwidth that could potentially be used according to a RAT at any given time, such as if narrowband sets of resources are commonly assigned according to the RAT. For example, in such a scenario, it may be possible for a wireless device to indicate the specific narrowband(s) that are in use according to a RAT to any other RATs implemented in the wireless device, rather than an entire system bandwidth from which the assigned narrowband(s) is (are) selected.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
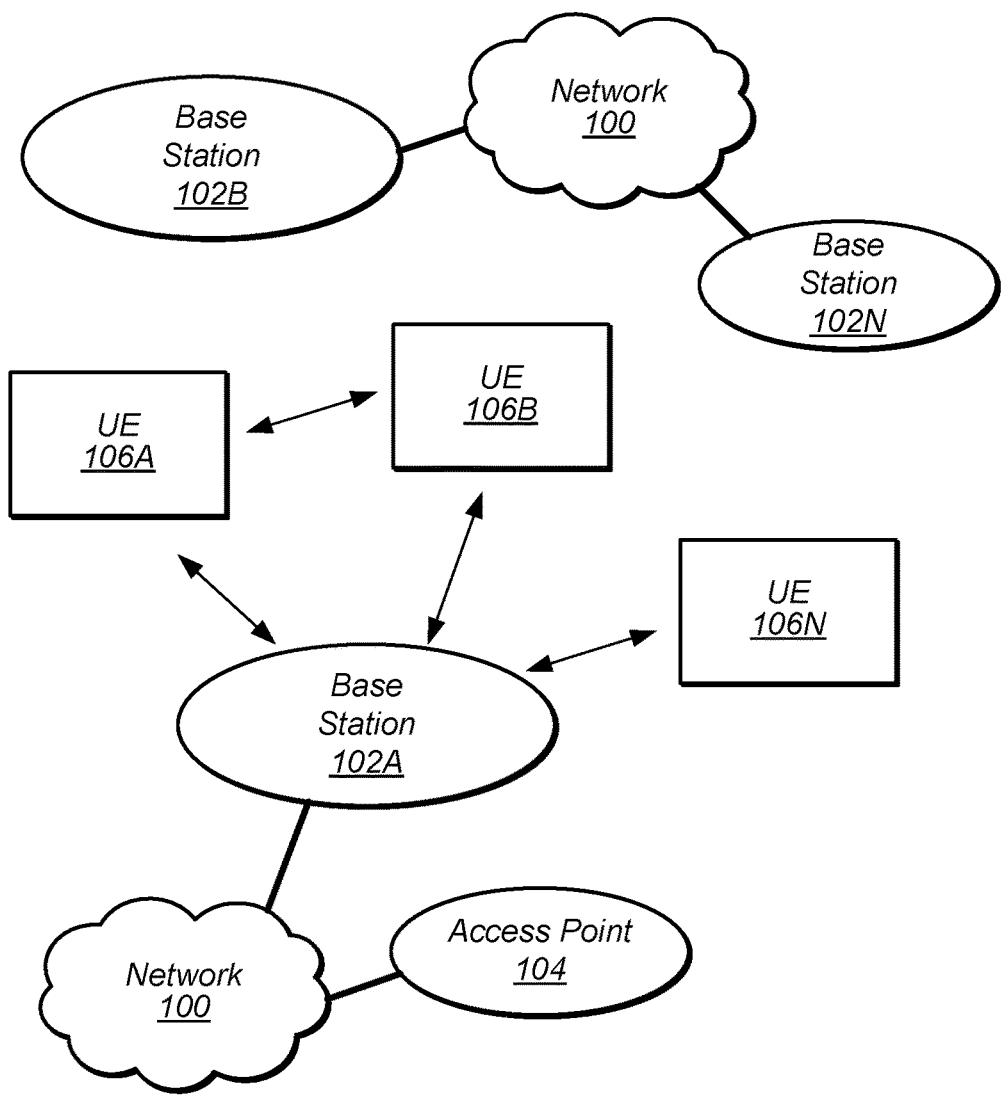
FIGS. 1-2 illustrate exemplary (and simplified) wireless communication systems, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
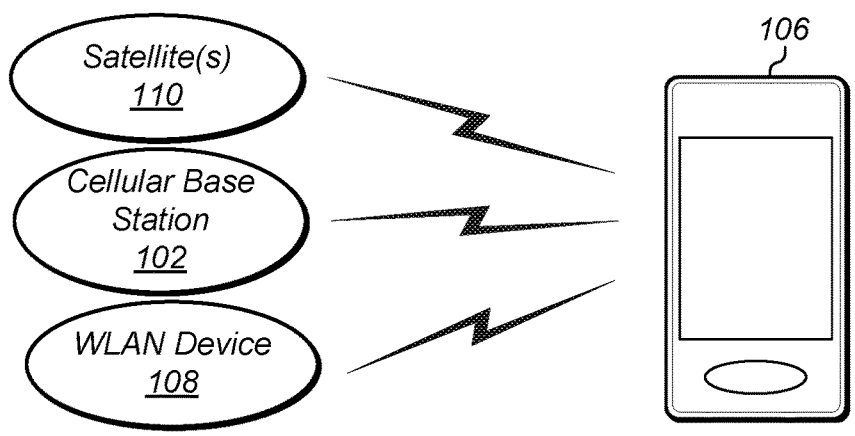

FIGS. 1 and 2—Communication System

FIG. 1 illustrates an exemplary (and simplified) wireless communication system, according to some embodiments. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices 106 and/or between the user devices 106 and the network 100. In some implementations, base station 102 can (e.g., also or alternatively) be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc. Additionally, one or more access points (such as access point 104) may be communicatively coupled to the network 100. These may include Wi-Fi access points configured to support cellular network offloading and/or otherwise provide wireless communication services as part of the wireless communication system illustrated in FIG. 1.

The UEs 106 may include handheld devices such as smart phones or tablets, or may be any of various other types of device with cellular communications capability. For example, one or more of the UEs 106 may be a wireless device intended for stationary or nomadic deployment such as an appliance, measurement device, control device, etc. In some instances, one or more of the UEs 105 may be referred to as an accessory device 107. An accessory device may be any of various types of wireless devices, typically a wearable device that has a smaller form factor, and may have limited battery, output power and/or communications abilities relative to at least some other UEs 106.

According to some embodiments, an accessory device may include cellular communication capability and hence may be able to directly communicate with cellular base station 102. However, since accessory devices may possibly be one or more of communication, output power and/or battery limited, such devices may in some instances selectively utilize a companion device as a proxy for communication purposes with the base station 102 and hence to the network 100. In other words, an accessory device may selectively use the cellular communication capabilities of a companion device to the accessory device to conduct its cellular communications. The limitation on communication abilities of the accessory device can be permanent, e.g., due to limitations in output power or the radio access technologies (RATs) supported, or temporary, e.g., due to conditions such as current battery status, inability to access a network, or poor reception.

To facilitate such use of a companion device as a proxy, and/or for any of various other purposes, in some embodiments multiple UEs may be able to communicate directly. For example, multiple UEs may be able to communicate using a peer-to-peer wireless communication technology such as Wi-Fi peer-to-peer or Bluetooth, or with one of the UEs acting as a Wi-Fi access point. For example, UE 106A and UE 106B are illustrated as being in direct communication in FIG. 1. As one possibility, this might occur if the UE 106A is a smart phone carried by a user, and the UE 106B is a smart watch (e.g., an accessory device to the smart phone) worn by that same user. Other scenarios in which direct communication occurs between UEs are also possible.

Base station 102A and other similar base stations (such as base stations 102B . . . 102N) and/or access points (such as access point 104) operating according to the same or a different wireless communication standard may thus be provided as a network of cells, which may provide continuous or nearly continuous overlapping service to UEs 106A-N and similar devices over a geographic area via one or more wireless communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations) and/or wireless local area networks (WLANs), which may be referred to as "neighboring cells" or "neighboring WLANs" (e.g., as appropriate), and/or more generally as "neighbors". Such neighbors may also be capable of facilitating communication between user devices and/or between user devices and the network 100. Such neighbors may include "macro" cells, "micro" cells, "pico" cells, "femto" cells, WLANs, and/or cells which provide any of various other granularities of service area size. For example, base stations 102A-B illustrated in FIG. 1 might provide macro cells, base station 102N might provide a micro cell, and access point 104 might be a Wi-Fi AP which provides a WLAN. Note also that in some instances, a UE (such as one of UEs 106A-N) may be served by multiple neighboring cells (e.g., a serving set), for example using coordinated multipoint (CoMP) wireless communication. Other configurations are also possible.

At least in some instances, a UE 106 may additionally be capable of receiving satellite communication signals. For example, one or more of the illustrated UEs 106 may be capable of utilizing one or more global navigational satellite systems (GNSS, e.g., GPS or GLONASS), and/or one or more other satellite-based communication systems.

Thus, a UE 106 may be capable of communicating using multiple wireless communication technologies. For example, a UE 106 might be configured to communicate using two or more of GSM, UMTS, CDMA2000, LTE, LTE-A, WLAN, Bluetooth, one or more global navigational satellite systems, one or more mobile television broadcasting standards (e.g., ATSC-M/H), etc. Other combinations of wireless communication technologies (including more than two wireless communication technologies) are also possible.

Figure 5:
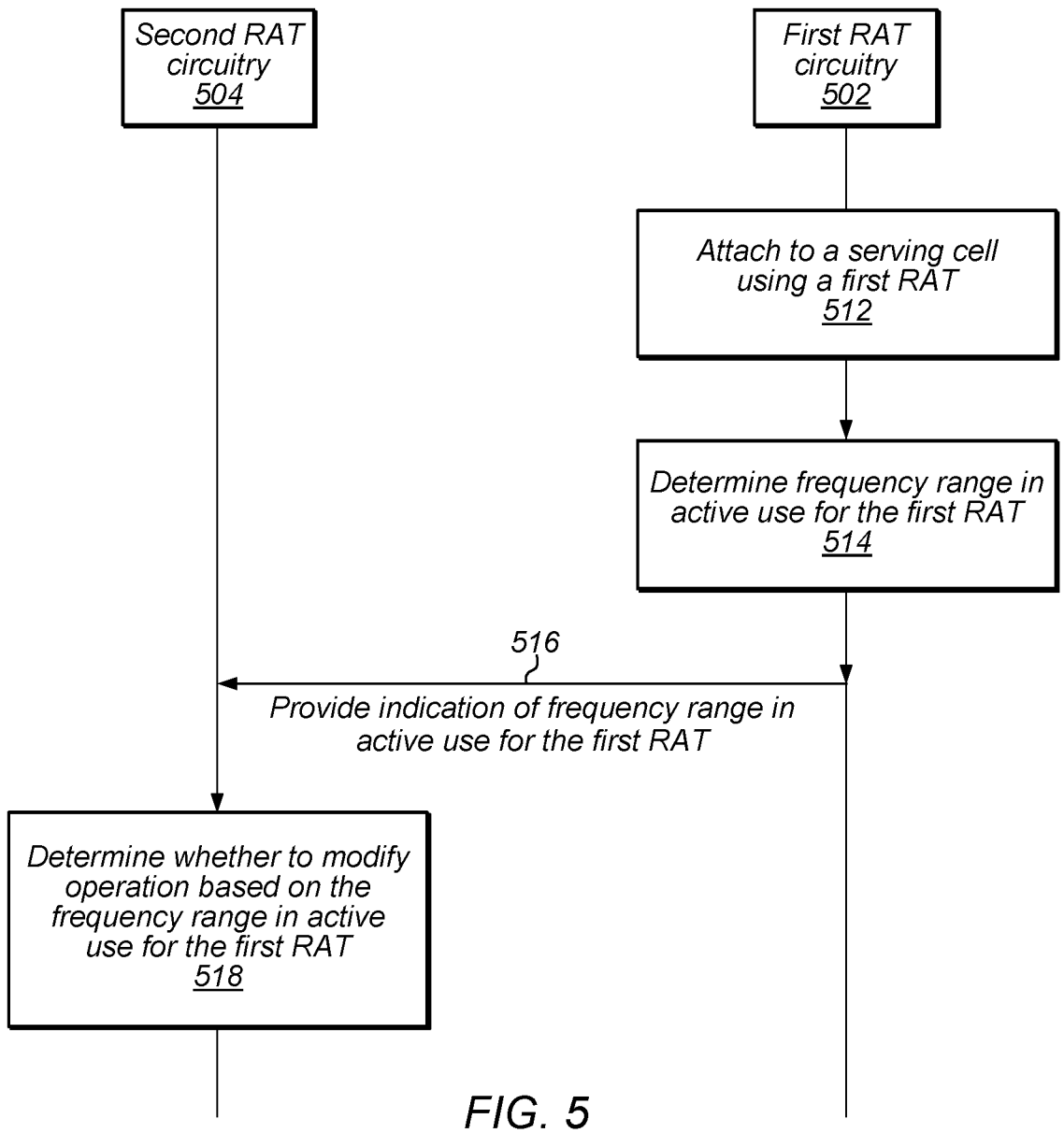
FIG. 5 is a communication flow diagram illustrating aspects of an exemplary method for using narrow band awareness to improve coexistence characteristics of a wireless device, according to some embodiments.

Any or all of the network 100, base stations 102, access points 104, and/or UEs 106 illustrated in FIG. 1 may be configured to implement or support implementation of part or all of the methods described herein, including, inter alia, the method of FIG. 5.

FIG. 2 illustrates an exemplary (and simplified) system in which user equipment 106 (e.g., one of the devices 106A through 106N) is capable of using (e.g., concurrently and/or at different times) multiple wireless communication technologies. The UE 106 may be any of various types of device, such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple radio access technologies/wireless communication protocols. As one possibility, the UE 106 may be configured to communicate using at least one cellular communication technology, at least one wireless local area network technology, and at least one satellite communication technology. For example, as shown, the UE 106 may be capable of communicating with one or more satellites 110 (e.g., according to one or more GNSS technologies), one or more cellular base stations 102 (e.g., according to one or more cellular communication technologies), and/or one or more devices 108 available via a wireless local area network (e.g., according to one or more WLAN technologies). Other combinations of wireless communication technologies are also possible.

The UE 106 may include one or more antennas for communicating using the wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios that are shared between multiple wireless communication protocols and one or more radios that are used exclusively by a single wireless communication protocol. For example, the UE 106 might include a shared radio for communicating using either of LTE and 1×RTT (or LTE or GSM), and separate radios for communicating using each of Wi-Fi and GNSS. Other configurations are also possible.

Figure 3:
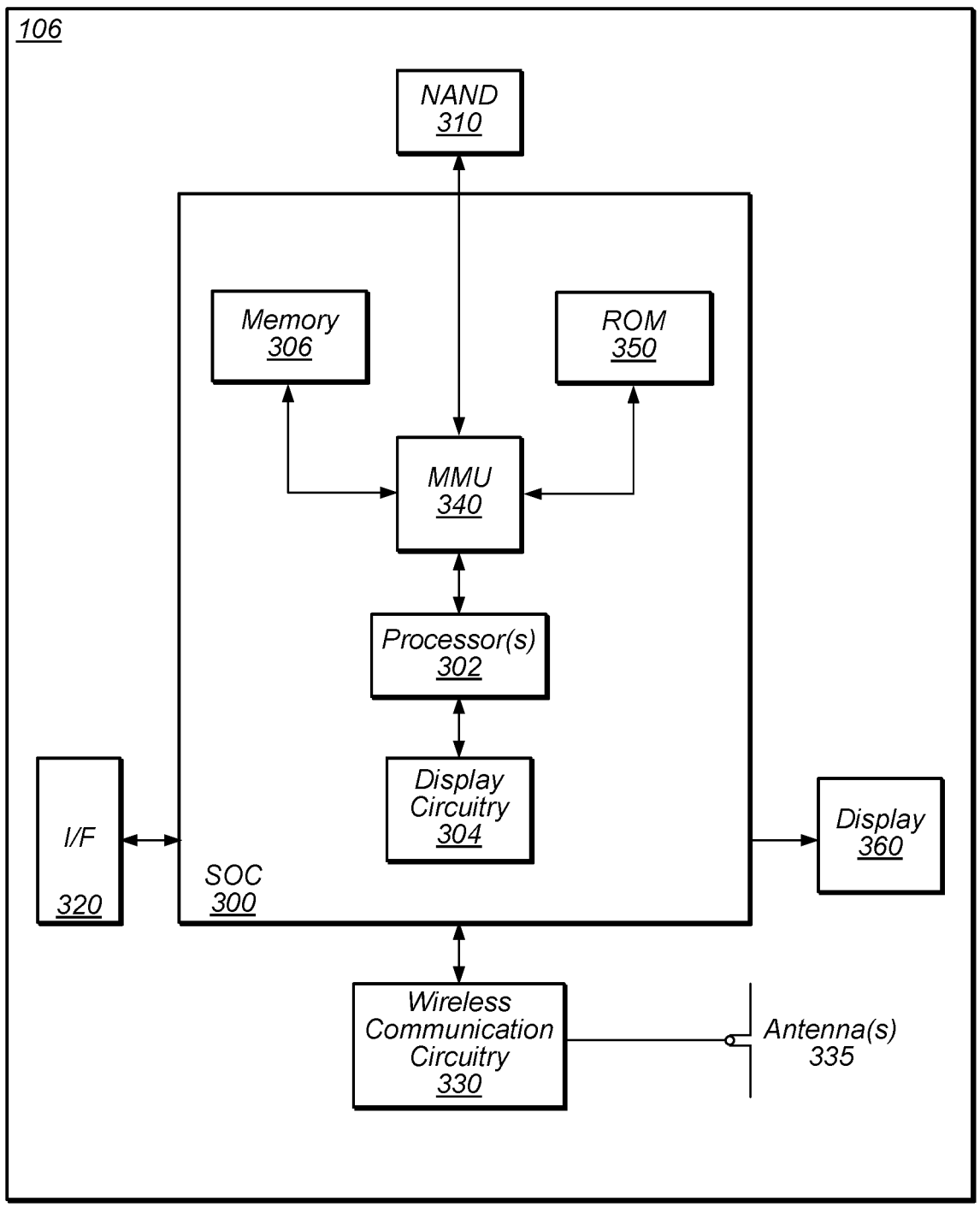
FIG. 3 illustrates a block diagram of an exemplary wireless device, according to some embodiments.

FIG. 3—Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302, which may execute program instructions for the UE 106, and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), an interface 320 (e.g., for coupling to a computer system, dock, charging station, etc.), display 360, and wireless communication circuitry (e.g., radio(s)) 330 (e.g., for LTE, LTE-A, NR, CDMA2000, Bluetooth, Wi-Fi, NFC, GPS, etc.).

The UE device 106 may include at least one antenna, and in some embodiments multiple antennas, for performing wireless communication with base stations and/or other devices. For example, the UE device 106 may use antenna(s) 335 to perform the wireless communication. As noted above, the UE 106 may be configured to communicate wirelessly using multiple wireless communication standards in some embodiments. Note that while a single wireless communication block 330 is illustrated in FIG. 3, this may be intended to be representative of any number of possible device architectures that may be used to provide the wireless communication functionality of the UE 106. For example, as one possibility, each wireless communication technology implemented by the UE 106 may be provided using distinct circuitry (e.g., different chipsets). As another possibility, some or all of the wireless communication technologies implemented by the UE 106 may be provided using shared and/or co-located circuitry (e.g., one or more common chipsets). For example, cellular and GPS functionality could be provided using one chipset and Wi-Fi and Bluetooth functionality could be provided using different respective chipsets, or using a common Wi-Fi/Bluetooth chipset.

As described further subsequently herein, the UE 106 may include hardware and software components for implementing part or all of the methods described herein. For example, one or more components of the wireless communication circuitry 330 may be configured to implement part or all of the methods described herein, e.g., by executing program instructions stored on a memory medium (e.g., a non-transitory computer-readable memory medium). Alternatively or additionally, part or all of the methods described herein may be implemented using the processor(s) 302 of the UE device 106. In some embodiments, processor(s) 302 may be configured as a programmable hardware element, such as an FPGA (Field Programmable Gate Array), or as an ASIC (Application Specific Integrated Circuit). Alternatively (or in addition) the processor(s) 302 of the UE device 106, in conjunction with one or more of the other components 300, 304, 306, 310, 320, 330, 335, 340, 350, 360 may be configured to implement part or all of the features described herein.

Figure 4:
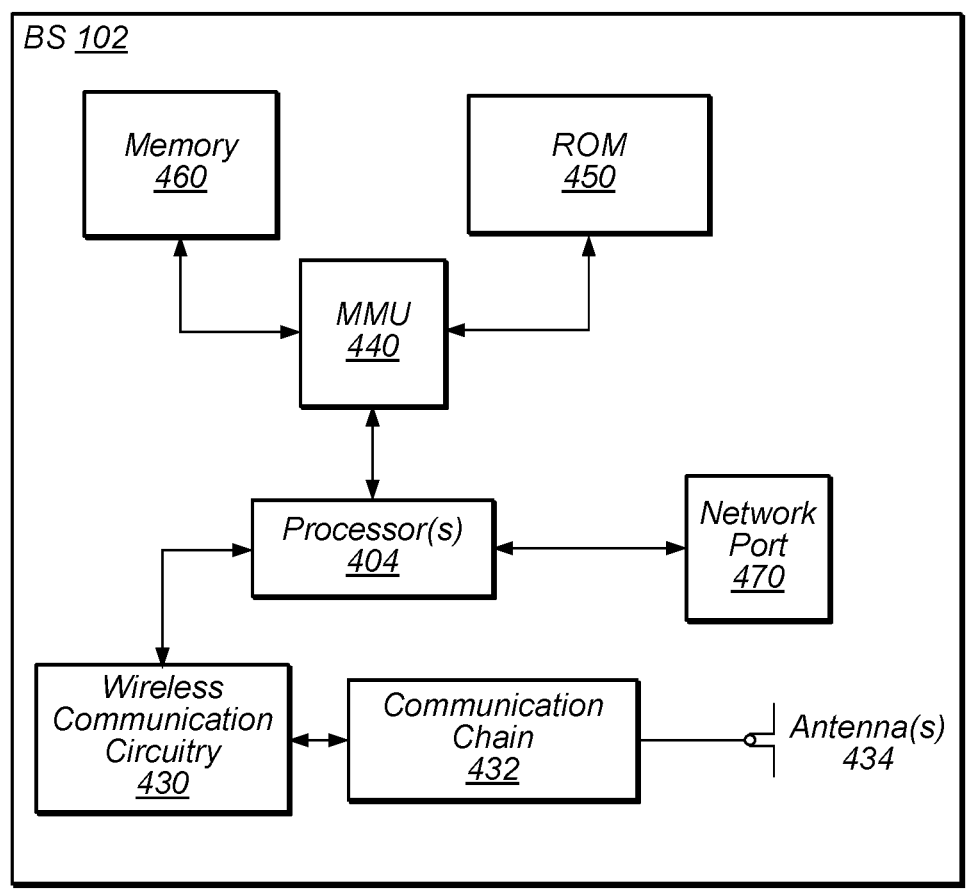
FIG. 4 illustrates a block diagram of an exemplary base station, according to some embodiments.

FIG. 4—Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404, which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in relation to FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via wireless communication circuitry 430. The antenna(s) 434 communicates with the wireless communication circuitry 430 via communication chain 432. Communication chain 432 may be a receive chain, a transmit chain or both. In some implementations, communication chain 432 may include multiple receive chains, multiple transmit chains, or both. The wireless communication circuitry 430 may be configured to communicate via various wireless communication standards, potentially including, but not limited to, LTE, LTE-A, NR, GSM, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as either or both of an LTE base station and a Wi-Fi access point. As another possibility, the base station 102 may include a multi-mode radio, which is capable of performing communications according to any of multiple wireless communication technologies (e.g., LTE and Wi-Fi, LTE and UMTS, LTE and CDMA2000, UMTS and GSM, etc.).

The BS 102 may include hardware and software components for implementing or facilitating implementation of part or all of the methods described herein. The processor(s) 404 of the base station 102 may be configured to implement or support implementation of part or all of the methods described herein, e.g., by executing program instructions stored on a memory medium (e.g., a non-transitory computer-readable memory medium). Alternatively, the processor(s) 404 may be configured as a programmable hardware element, such as an FPGA (Field Programmable Gate Array), or as an ASIC (Application Specific Integrated Circuit), or a combination thereof. Alternatively (or in addition) the processor(s) 404 of the BS 102, in conjunction with one or more of the other components 430, 432, 434, 440, 450, 460, 470 may be configured to implement or support implementation of part or all of the features described herein.

FIG. 5—Communication Flow Diagram

As cellular communication technologies evolve, an increasing number of cellular communication capable devices are expected to be deployed. One of the reasons for the continuing increase in the numbers of devices includes the development and spread of devices performing machine type communication (MTC). Such devices, which may include stationary deployed devices, wearable devices, and/or other devices forming part of the "Internet of Things", may commonly be designed to perform frequent and/or periodic small data transmissions.

In view of the potentially more limited expected usage scenarios for many such devices, devices primarily expected to perform MTC may commonly be lower-complexity devices than many other common cellular devices (e.g., handheld cellular phones, etc.), for example to reduce the size, cost of manufacture, and/or cost to the consumer of such devices. Accordingly, in many instances the communication capability (e.g., number and/or power level of antennas, battery capability, communication range, etc.) of such devices may be relatively limited. For example, many such devices may be considered link budget limited devices.

This may present difficulties in a wireless communication system that primarily supports wireless devices with greater communication capability. Accordingly, at least some wireless communication technologies are being revised and/or developed in a manner to support link budget limited devices (e.g., in addition to those wireless devices that are not link budget limited). One feature that is being at least considered for adoption in an increasing number of scenarios may include the use of narrowband communication channels. For example, at least some devices may benefit from using a narrower communication bandwidth (e.g., 1.4 MHz channels for 3GPP Release 13 enhanced MTC (eMTC)/CAT-M1, 200 KHz channels for NB-IoT deployments, etc.) than the total system bandwidth of the cell to which they are attached, as this may be more power efficient than wider bandwidths for the quantities of data expected to be communicated by such devices, allow for a greater number of devices to be served, and/or provide other possible benefits. In some embodiments, frequency hopping techniques may additionally be used, e.g., to provide frequency diversity benefits, among various possible reasons.

It may be common for a device that implements a RAT that utilizes such narrowband communication channels to also implement one or more other RATs, potentially including one or more RATs that may utilize one or more overlapping, adjacent, or nearby frequency bands. In such a case, there may be potential for interference to occur between such RATs, such as if transmission activities for one RAT are occurring at the same time as reception activities for another RAT with transmission and/or reception characteristics (e.g., frequency distance, transmit power, adjacent channel leakage ratio, antenna isolation, receiver sensitivity, etc.) that result in interference at the receiving RAT.

Accordingly, a wireless device may implement in-device coexistence functionality to help mitigate this impact, e.g., using knowledge of the frequencies used by each RAT. In a scenario where one of the RATs uses narrowband communication channels, agile awareness and use of the frequency range in use by that RAT at any given time at a fine level of granularity may provide improved coexistence characteristics between RATs, e.g., in comparison with techniques that assume a RAT will use its entire cell system bandwidth or even a broader operating band when making coexistence decisions.

FIG. 5 is thus provided as a communication/signal flow diagram illustrating an example method for a wireless device to dynamically provide actively used frequency range updates between its radio access technology modules to improve coexistence characteristics of the wireless device, according to some embodiments. Aspects of the method of FIG. 5 may be implemented by a wireless device such as UE 106 illustrated in and described with respect to FIGS. 1-3, or more generally in conjunction with any of the computer systems or devices shown in the above Figures, among other devices, as desired. For example, the method of FIG. 5 may include communication via a logical (and possibly physical, e.g., depending on the device architecture) coexistence interface between circuitry/software of the wireless device used to implement a first RAT (first RAT circuitry 502) and circuitry/software of the wireless device used to implement a second RAT (second RAT circuitry 504).

In various embodiments, some of the elements of the method shown may be performed concurrently, in a different order than shown, may be substituted for by other method elements, or may be omitted. Additional elements may also be performed as desired. As shown, the method may operate as follows.

In 512, the wireless device may attach to a serving cell using a first RAT, e.g., using device circuitry configured to implement the first RAT. The first RAT may be any of various possible RATs, such as NR, LTE, LTE-A, UMTS, CDMA2000, GSM, etc. According to some embodiments, the first RAT may be LTE, and the wireless device may be a category M1 device configured to utilize MTC techniques when communicating with the serving cell.

To attach to/camp on the serving cell, the wireless device may detect that the serving cell exists, obtain timing synchronization and decode system information for the serving cell, and attach to the cell (e.g., by performing an attachment procedure), according to some embodiments. In some instances, the wireless device may further establish a radio resource control (RRC) connection with the serving cell, e.g., by way of a random access channel (RACH) procedure performed while operating in an idle mode, or in any of various other possible manners.

The serving cell may have a system bandwidth centered around a system center frequency. For example, if the serving cell is an LTE cell, the system bandwidth might be 1.4 MHz, 3 MHz, 5 MHz, 10 MHz, 15 MHz, or 20 MHz. Other system bandwidths may also be possible; for example, larger system bandwidths may be possible using carrier aggregation, other RATs may specify other possible system bandwidths, etc.

In 514, a frequency range in active use for the first RAT may be determined. This may include first determining a portion of the system bandwidth of the serving cell scheduled for communication between the serving cell and the wireless device, such as a narrowband channel on which a downlink or uplink communication (which may include a control signaling communication and/or a data communication) is scheduled.

The frequency range considered to be in active use for the first RAT may be based on the portion of the system bandwidth of the serving cell scheduled for communication between the serving cell and the wireless device. In some instances, the frequency range considered to be in active use for the first RAT may be identical to the portion of the system bandwidth of the serving cell scheduled for communication between the serving cell and the wireless device, while in other instances, a larger frequency range than the portion of the system bandwidth of the serving cell actually scheduled for communication between the serving cell and the wireless device may be considered to be in active use for the first RAT. The frequency range considered to be in active use for the first RAT may still include less bandwidth than the full system bandwidth or an amount and/or range of bandwidth that is otherwise different than the full system bandwidth, or may include the full system bandwidth, among various possibilities, e.g., depending on various possible considerations.

For example, in some instances the wireless device may determine whether any activities in addition to the communication between the serving cell and the wireless device using the portion of the system bandwidth are scheduled, and may determine whether to consider a wider frequency range than the portion scheduled for communication between the serving cell and the wireless device to be in active use to account for those additional activities. For example, if the wireless device expects to perform one or more system measurements (parameter estimation, channel estimation, etc.) that may make use of the entire system bandwidth or a frequency range that is otherwise larger than the portion scheduled for communication between the serving cell and the wireless device, the frequency range considered to be in active use for the first RAT may include such a larger frequency range.

As another possibility, the wireless device may determine an expected potential interference level from one or more other RATs implemented by the wireless device (e.g., the second RAT), and may determine whether to consider a wider frequency range than the portion scheduled for communication between the serving cell and the wireless device to be in active use to provide additional protection to the first RAT, e.g., based on the determined expected potential interference level. Such a wider frequency range may include additional bandwidth within the system bandwidth and/or extending outside of the system bandwidth, in various scenarios.

According to some embodiments, the wireless device (e.g., the first RAT circuitry of the wireless device) may further determine an amount of time for which the determined frequency range is in active use for communication according to the first RAT. This may be based on an amount of time for which the determined portion of the system bandwidth is scheduled for communication between the serving cell and the wireless device according to the first RAT, and indeed may be identical to that amount of time in some instances. In other instances, however, it may be determined that the determined frequency range is in active use for a larger amount of time. For example, it may be determined whether any activities (e.g., system measurements) that require an additional amount of time are scheduled or planned in addition to the scheduled communication between the serving cell and the wireless device, and if so, the amount of time for which the determined frequency range is considered in active use may be determined such that it is sufficient for those additional activities.

In 516, the first RAT circuitry of the wireless device may provide an indication of the frequency range in active use for the first RAT to the second RAT circuitry of the wireless device. The indication may be provided using in-device coexistence functionality of the wireless device, which may include a logical (and possibly physical) interface between portions of the wireless device implementing the respective RATs that coexist in overlapping/adjacent/nearby frequency bands. According to some embodiments, the in-device coexistence functionality may provide scheduling/arbitrating between the RATs to reduce or avoid interference, e.g., by not scheduling transmit/receive activities that would cause interference simultaneously, restricting frequency access by one or more RATs, and/or reducing transmit power, among various possibilities. Providing the indication of the frequency range in active use for the first RAT to the second RAT circuitry may assist the second RAT circuitry to reduce or avoid interference caused by or affecting the second RAT circuitry.

According to some embodiments, an indication may also be provided of the amount of time for which the determined frequency range is determined to be in active use for communication according to the first RAT, whether the determined frequency range will be in use for transmission and/or reception activities, a frequency hopping scheme in use by the first RAT, and/or any of various other possible characteristics of the communication according to the first RAT.

In 518, the wireless device (e.g., the second RAT circuitry of the wireless device) may determine whether to modify operation of the wireless device with respect to the second RAT based at least in part on the indication of the frequency range in active use for the first RAT. According to various embodiments, the determination may further be based on any indication(s) of the amount of time for which the determined frequency range will be in active use for communication according to the first RAT, whether the determined frequency range will be in use for transmission and/or reception activities, a frequency hopping scheme in use by the first RAT, and/or any of various other possible characteristics of the communication according to the first RAT that may be indicated to the second RAT circuitry by the first RAT circuitry.

At least according to some embodiments, it may be determined to modify the operation of the wireless device with respect to the second RAT if unmodified operation with respect to the second RAT is expected to result in interference occurring at the wireless device for the first RAT or the second RAT, e.g., in view of the frequency range in active use for the first RAT, a frequency range in active use by the second RAT, how much antenna isolation there is between an antenna (or antennas) used by the first RAT and an antenna (or antennas) used by the second RAT, whether one RAT would be transmitting while the other RAT would be receiving, the transmit power of the transmitting RAT, the adjacent channel leakage ratio of the transmitting RAT, and/or any of various other considerations.

The modification(s) to the operation of the wireless device with respect to the second RAT may include any of various possible modifications that reduce or avoid potential interference between the first and second RAT. For example, as one possibility, a transmission according to the second RAT might be delayed or canceled if it is determined that it would cause interference to reception according to the first RAT. As another possibility, a transmission according to the second RAT might still be performed, but with a reduced transmit power or using a different antenna with a greater degree of isolation from an antenna being used for reception according to the first RAT than would have been selected if not for the indication of the frequency range in active use for the first RAT. As a still further possibility, the second RAT may modify its frequency selection to try to avoid or reduce interference, for example by restricting frequency access by the second RAT to avoid the frequency range in active use for the first RAT.

The modification(s) may be applied based at least in part on the amount of time for which the frequency range is indicated to be in active use for the first RAT, according to some embodiments. For example, any modification(s) to the operation of the wireless device with respect to the second RAT may be enforced for the amount of time for which the frequency range is indicated to be in active use for the first RAT, after which the second RAT circuitry may resume unmodified operation, or possibly determine updated modifications, e.g., based on an updated indication of a frequency range in active use for the first RAT, as subsequently described herein.

In many instances, the frequency range in active use by the first RAT may change over time. For example, as previously noted, in some instances a frequency hopping pattern may be used. As another possibility, the wireless device may simply be scheduled for communication using different narrowband channels within the system bandwidth of the cell according to the first RAT at different times (e.g., at the discretion of the serving cell and not necessarily according to any predetermined pattern). In such instances, the first RAT circuitry may determine an updated frequency range (e.g., which may be different than the previously determined frequency range) in active use for the first RAT (e.g., based on similar considerations as the previously determined frequency range in active use for the first RAT), and provide an indication thereof (potentially along with other related information such as whether the updated frequency range is in use for transmission and/or reception, an amount of time for which the updated frequency range is expected to be in active use, etc.) to the second RAT circuitry. The second RAT circuitry may accordingly determine based at least in part on this updated information whether to modify the operation of the wireless device with respect to the second RAT.

Thus, the first RAT circuitry and the second RAT circuitry may be able to communicate through an in-device coexistence interface to facilitate the second RAT circuitry maintaining agile awareness of the frequency range and other communication characteristics in use by the first RAT at any given time. Such a more finely grained awareness of the communication characteristics in use by the first RAT may reduce the impact of the first RAT's communications on the second RAT and/or vice versa, at least according to some embodiments, e.g., as the second RAT may be able to continue communicating (e.g., avoid modifying its operation) more often compared to a more coarsely grained approach in which an entire operating band of the first RAT or the entire system bandwidth of the serving cell that operates according to the first RAT is considered in active use by the first RAT whenever the first RAT is active.

Figure 6:
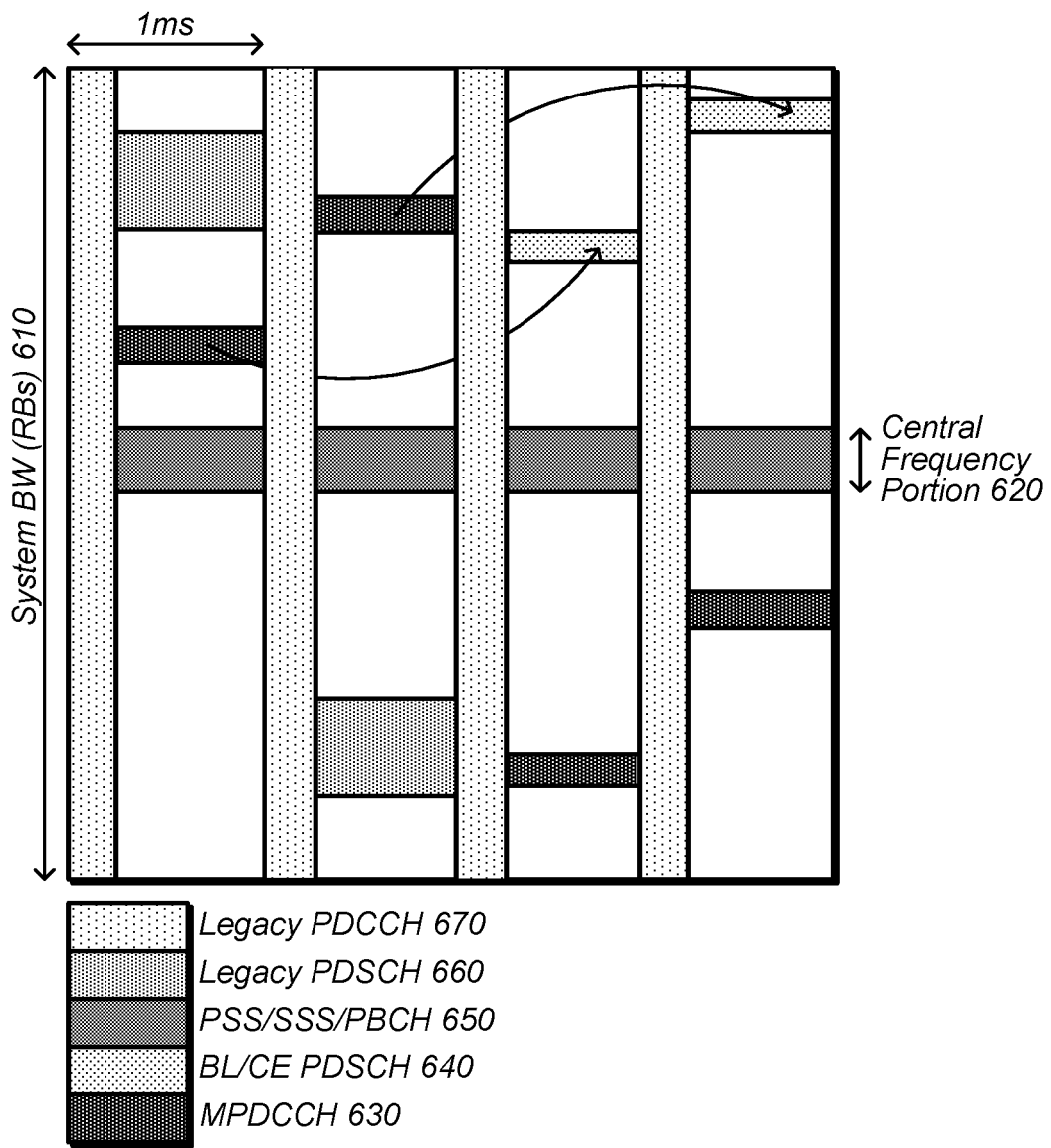
FIGS. 6-7 illustrate exemplary possible wireless communication schedule portions including narrowband communication with frequency hopping, according to some embodiments.
Figure 7:
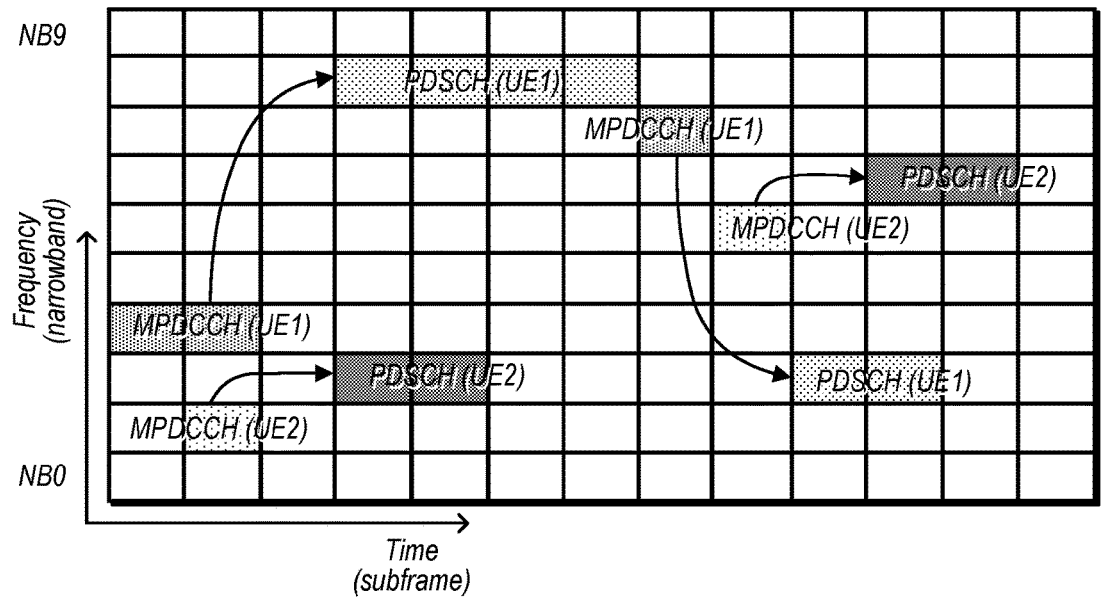
Figure 8:
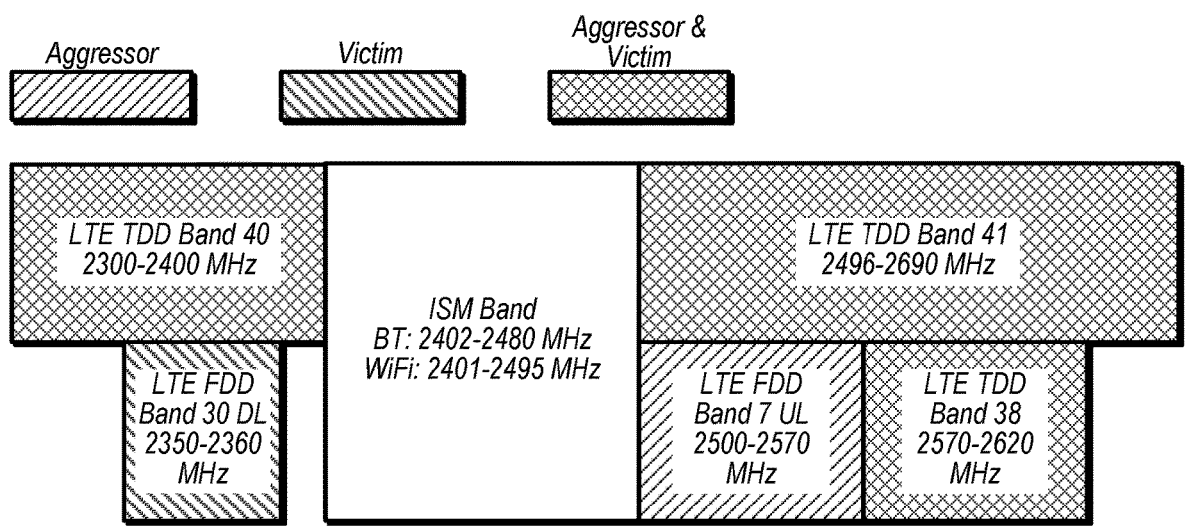
FIG. 8 illustrates an exemplary possible set of frequency bands that may be used by different RATs and that may have the potential to cause or be subject to interference, according to some embodiments.

FIGS. 6-8—Additional Information

FIGS. 6-8 and the information provided herein below in conjunction therewith are provided by way of example of various considerations and details relating to possible systems in which the method of FIG. 5 and/or other aspects of this disclosure may be implemented, and are not intended to be limiting to the disclosure as a whole. Numerous variations and alternatives to the details provided herein below are possible and should be considered within the scope of the disclosure.

In 3GPP Release 13, enhanced machine-type communication (eMTC), or CAT-M1, is introduced for power efficient and coverage limited operation. Features introduced in conjunction with and for supporting CAT-M1 may include reduced operating bandwidth (e.g., narrowbands of 1.4 MHz or 6 physical resource blocks), use of time-domain repetitions and frequency hopping for control and data channels, reduced complexity (e.g., fewer supported transmission modes, blind decoding configurations, and/or modulation options), and/or cross-subframe channel estimation (e.g., for both UEs and BSs) and power-boosting (e.g., for BSs) CAT-M1 communication may be suitable for low-complexity, power-efficient, and coverage-limited devices, potentially including wearable devices, among various possibilities.

As previously noted, CAT-M1 may support narrowband transmission for both control and data communications. For example, any or all of the MTC physical downlink control channel (MPDCCH), physical downlink shared channel (PDSCH), and/or physical uplink shared channel (PUSCH) may be transmitted on a (possibly different) narrow band. Further, both control and data channels can have repetition and frequency hopping.

For coverage enhanced (CE) mode A CAT-M1, channel state information (CSI) reporting may support multiple modes, e.g., including Mode 1-0, Mode 1-1, and Mode 2-0. In Mode 2-0, aperiodic subband channel quality information (CQI) may be reported, allowing the UE to select its preferred subband. In modes 1-0 and 1-1, periodic wideband CQI and precoding matrix indicator (PMI) may be reported.

FIG. 6 is a time/frequency diagram illustrating possible CAT-M1 narrowband 3GPP operations alongside legacy 3GPP operations for a 3GPP cell, according to some embodiments. As shown, a certain portion of each subframe may be used to provide the legacy PDCCH 670 across the entire system bandwidth 610. When not being used for the legacy PDCCH 670, a central frequency portion 620 of the system bandwidth of the cell may be used to provide synchronization signaling 650, e.g., including primary synchronization signals (PSS), secondary synchronization signals (SSS), and a physical broadcast channel (PBCH), e.g., to facilitate system acquisition by UEs scanning for and potentially attaching to the cell, and to facilitate UEs obtaining and maintaining synchronization with the cell. Various portions of the remainder of the system bandwidth may be also be used to provide the legacy PDSCH 660.

As also shown, and as further shown in FIG. 7, the MPDCCH 630 and the bandwidth-reduced low-complexity/ coverage enhanced (BL/CE) PDSCH 640 may be transmitted on narrowband portions of the system bandwidth, potentially with BL/CE PDSCH 640 subframes occurring with a gap of one subframe after MPDCCH 630 subframes scheduling the BL/CE PDSCH 640 subframes, and further potentially with BL/CE PDSCH 640 subframes occurring on a different narrowband than MPDCCH 630 subframes scheduling the BL/CE PDSCH 640 subframes.

The BS may configure the frequency hopping and subframe repetition characteristics for CAT-M1 UEs. Cell-specifically configured parameters may include a hopping distance (e.g., in terms of number of narrowbands), number of narrowbands in the hopping, number of subframes to remain in the same narrowband before hopping to the next narrowband, among various possibilities. At least in some embodiments, all such parameters may be applicable for both data and control communications.

UE-specifically configured parameters may include one or more semi-statically configured parameters and one or more dynamically configured parameters. The semi-statically configured parameters may include the first subframe and the first narrowband to monitor the MPDCCH 630 in a repetition. The following narrowband and subframe of monitoring the MPDCCH 630 may be derived by the UE. The semi-statically configured parameters may further include whether to enable or disable frequency hopping, and a maximum repetition number for the MPDCCH 630. The dynamically configured parameters may include providing frequency hopping activation/deactivation indications for PDSCH/PUSCH via downlink control information (DCI), and the number of subframe repetitions in use for the PDSCH/PUSCH/MPDCCH.

As noted previously, FIG. 7 is a time/frequency diagram illustrating possible scheduling of narrowband MPDCCH and PDSCH communications using frequency hopping. In the illustrated example, UE1 and UE2 may be configured with frequency hopping offsets of 5 narrowbands (NBs) and 2NBs for MPDCCH monitoring and hopping (NB index may be wrapped around 10, the total number of NBs in this example). The repetition number of the MPDCCH and the PDSCH may be changed dynamically, e.g., in accordance with the DCI configuration. As shown, the starting subframe and index for the first NB of the MPDCCH is configured differently for UE1 and UE2 in this example.

When a wireless device utilizing LTE camps on a band that is close to an industrial, scientific, and medical (ISM) band, if the wireless device is also using a communication technology that uses the ISM band (e.g., Wi-Fi, Bluetooth), or possibly if a global navigational satellite system (GNSS) is working, then interference may occur and potentially cause deterioration to the performance of one or more of those communication technologies involved. FIG. 8 is a diagram illustrating the 2.4 GHz ISM band and various nearby LTE bands that may be aggressors to, victims of, or both aggressors to and victims of communication occurring in the ISM band, according to some embodiments. As shown, the LTE FDD band 30 for downlink operation in 2350-2360 MHz may be a potential victim to BT or Wi-Fi communication in the ISM band. The LTE FDD band 7 for uplink operation in 2500-2570 MHz may be a potential aggressor to BT or Wi-Fi communication in the ISM band. The LTE TDD bands 40 (2300-2400 MHz), 41 (2496-2690 MHz), and 38 (257-2620 MHz) may be potential aggressors to or victims of BT or Wi-Fi communication in the ISM band. For example, LTE uplink operations may interfere with Wi-Fi/BT reception operations, while Wi-Fi/BT transmit operations may interfere with LTE downlink operations.

In-device coexistence (IDC) functionalities may be implemented to mitigate this impact. IDC may consider various factors such as LTE, Wi-Fi, and BT activities, antenna isolation, adjacent channel leakage ratio (ACLR), frequency distance, traffic priority, transmit power, and/or receiver sensitivity. The IDC may act as a scheduler/arbitrator so that Tx/Rx interference between LTE and Wi-Fi/BT is avoided or reduced to a tolerable level by various means, such as by not scheduling Tx/Rx simultaneously, restricting frequency access, and/or reducing Tx power. For example, if LTE DL traffic has high priority and IDC detects Wi-Fi/BT Tx activities, the IDC may drop or delay the Wi-Fi/BT transmission.

Conventional LTE/LTE-A devices may be wideband devices, e.g., as such UEs that may need to monitor control channels (e.g., PDCCH, PHICH) that are transmitted over the entire system bandwidth of their cells. Accordingly, when IDC evaluates interference to/from Wi-Fi/BT, it may consider the interference impact on the entire system bandwidth (or possibly even operating band).

However, for a CAT-M1 UE, the UE may be scheduled to monitor a narrow band MPDCCH, which may trigger PDSCH reception or PUSCH transmission in a narrow band after one subframe, possibly with frequency hopping configured for one or more of those channels in a semi-dynamic or dynamic yet deterministic pattern. Thus, since CAT-M1 devices may generally only be transmitting or receiving on a narrowband (e.g., 6 RBs/1.4 MHz), possibly with hopping configured, in some instances a CAT-M1 device may be scheduled on a narrowband that is sufficiently far away from ISM that potential mutual interference between them may be low enough that there may be no need to adjust the operation of either side.

Accordingly, it may be useful to monitor the frequency range actually being actively used by a CAT-M1 device dynamically and provide IDC updates as needed to potentially improve coexistence with Wi-Fi/BT and/or other RATs. For example, based on narrow band scheduling information, including MPDCCH, PDSCH, and PUSCH, the UE may set certain RBs/narrow bands to be "active" dynamically, and inform Wi-Fi/BT module(s) of the active narrow bands so that Wi-Fi/BT interference to LTE can be avoided or Wi-Fi/BT can be scheduled around the LTE activity to avoid LTE interference. At each subframe, the active narrow bands may include at least the narrow band on which the MPDCCH/PDSCH/PUSCH is scheduled; additional narrow bands (or portions of narrow bands) can be set as active when needed, for example for measurement, channel estimation, etc. If no frequency hopping is enabled for either MPDCCH, PDSCH, or PUSCH, the active NB(s) may remain unchanged, e.g., until the BS reconfigures the UE. If frequency hopping is enabled for either MPDCCH, PDSCH, or PUSCH, the active NB(s) may change as subframes progress according to the frequency hopping configuration. The updates to Wi-Fi/BT can be provided on a per-subframe basis or as needed (e.g., whenever there is a change to the active narrow band pattern).

For a CAT-M1 UE, at each scheduled receiving subframe the UE may be configured to receive at a single narrow band, and may be configured to receive either the MPDCCH or the PDSCH (e.g., but not both in the same subframe). The LTE module of the UE may inform the IDC module of a set of protected (active) narrow bands for a set of subframes in advance. As one possible technique, a certain number of consecutive narrow bands {m−m1, . . . m, . . . , m+m2} may be set to be active at consecutive subframes {n−n1, . . . . . , n, . . . . , n+n2}, where m is the narrow band scheduled to receive the MPDCCH/PDSCH and n is the first subframe of the MPDCCH/PDSCH during a repetition.

The selection of {m1, m2} and {n1, n2} may depend on the interference level from Wi-Fi/BT. For example, for higher interference, larger values can be chosen to provide more protection. Additionally or alternatively, any other LTE activities (e.g., parameter estimation, channel estimation) that may require extra wake-up subframes and/or wider frequency ranges may be considered. In this case, the value(s) can be chosen to provide sufficient protection for those activities.

If frequency hopping is not configured, the values of {m, m1, m2} and {n, n1, n2} may remain the same unless reconfigured by the BS, so these values may be updated to the IDC only if they are changed; otherwise, the IDC may assume the same values remain valid.

If frequency hopping is configured, the values of {m, m1, m2} and {n, n1, n2} may change from subframe to subframe according to a frequency hopping pattern. In this case, as one possibility, {m, m1, m2} may be sent at subframe n−n0 to the IDC to indicate the active narrow band(s) at subframe n. As another possibility, a predefined hopping pattern may be signaled to the IDC and the IDC may assume the same pattern remains valid unless a new pattern is received.

Thus, as one example, when a UE is in idle mode, it may be configured to monitor the MPDCCH (e.g., for paging, etc.) as well as to perform cell search/measurement, parameter estimation (e.g., timing/frequency offset, Doppler/delay spread, etc.). In this case the active narrow band(s) in use at a given time may depend on when the measurement and parameter estimation activities occur and when paging occasions are scheduled.

As another example, when a UE is in connected mode, if a downlink grant is decoded on the MPDCCH at a subframe n, scheduling information, frequency hopping pattern, and repetition level may be used to decide the active narrowband(s) for the subframe n+2, which may be indicated to the IDC at subframe n+1. If the UE does not decode a downlink grant on the MPDCCH at subframe n, a previous active narrow band pattern may continue to be used.

For a CAT-M1 UE, if an uplink grant is decoded in the MPDCCH at subframe n, the PUSCH may be transmitted at n+k1 for Nrep number of subframes at narrow band m (or possibly following a certain frequency hopping pattern), where k1=4 for FDD. The subframe set and narrowband set on which PUSCH transmission is scheduled may be indicated to the IDC, so that Wi-Fi/BT can avoid reception on these times/frequencies to avoid interference. At least according to some embodiments, no additional narrow bands or subframes may be claimed as being in active use for transmission of the PUSCH beyond those actually scheduled, e.g., potentially in contrast to at least some MPDCCH/PDSCH scenarios. Note that a similar concept may be applied for uplink control information transmissions (e.g., transmission of the physical uplink control channel (PUCCH)) as well, if desired.

Note further that while many of the techniques described herein are described primarily in reference to eMTC/CAT-M1 deployments that employ narrowband communication, similar techniques may be used with other wireless communication technologies, e.g., that similarly utilize narrowband communication. For example, at least according to some embodiments, similar techniques may be used in conjunction with NB-IoT carriers that may have approximately 200 kHz width, if desired.

Still further, note that while many of the techniques described herein are also described primarily in reference to Wi-Fi and/or BT as potential radio access technologies coexisting with a RAT that employs narrowband communication, similar techniques may also be used in conjunction with other RATs coexisting with a RAT that employs narrowband communication. For example, a dual-SIM dual standby (DSDS) device might employ IDC functionality such as described herein to improve coexistence characteristics between a CAT-M1 LTE SIM and a GSM SIM, if desired.

In the following further exemplary embodiments are provided.

One set of embodiments may include a method, comprising: by a wireless device: attaching to a serving cell according to a first radio access technology, wherein the serving cell has a system bandwidth centered around a system center frequency; determining a first portion of the system bandwidth scheduled for communication between the serving cell and the wireless device, wherein the first portion of the system bandwidth scheduled for communication between the serving cell and the wireless device is less than the full system bandwidth; determining a first frequency range in active use by the wireless device for communication according to the first RAT based at least in part on the first portion of the system bandwidth being scheduled for communication between the serving cell and the wireless device; providing an indication of the first frequency range from a portion of the wireless device implementing the first RAT to a portion of the wireless device implementing a second RAT; and determining whether to modify operation of the wireless device with respect to the second RAT based at least in part on the indication of the first frequency range.

According to some embodiments, the method further comprises: providing an indication of whether the first frequency range is in active use for transmission or reception by the wireless device according to the first RAT from the portion of the wireless device implementing the first RAT to the portion of the wireless device implementing the second RAT; and determining whether to modify operation of the wireless device with respect to the second RAT further based at least in part on the indication of whether the first frequency range is in active use for transmission or reception by the wireless device according to the first RAT.

According to some embodiments, the method further comprises: providing an indication of a frequency hopping pattern in use by the wireless device for the first RAT from the portion of the wireless device implementing the first RAT to the portion of the wireless device implementing the second RAT; and determining whether to modify operation of the wireless device with respect to the second RAT further based at least in part on the indication of the frequency hopping pattern in use by the wireless device for the first RAT.

According to some embodiments, determining the first frequency range further comprises: determining an expected potential interference level from the second RAT; and determining whether a larger frequency range than the first portion of the system bandwidth is in active use by the wireless device for communication according to the first RAT based at least in part on the expected potential interference level from the second RAT.

According to some embodiments, determining the first frequency range further comprises: determining whether any activities in addition to the communication between the serving cell and the wireless device using the first portion of the system bandwidth are scheduled; and determining whether a larger frequency range than the first portion of the system bandwidth is in active use by the wireless device for communication according to the first RAT based at least in part on whether any activities in addition to the communication between the serving cell and the wireless device using the first portion of the system bandwidth are scheduled.

According to some embodiments, the first portion of the system bandwidth is scheduled for communication between the serving cell and the wireless device for a first amount of time, wherein the method further comprises: determining whether any activities in addition to the communication between the serving cell and the wireless device using the first portion of the system bandwidth are scheduled that require an additional amount of time; determining an amount of time for which the first frequency range is in active use by the wireless device for communication according to the first RAT based at least in part on the first amount of time and whether any activities in addition to the communication between the serving cell and the wireless device using the first portion of the system bandwidth are scheduled that require an additional amount of time; and providing an indication of the amount of time for which the first frequency range is in active use by the wireless device for communication according to the first RAT from the portion of the wireless device implementing the first RAT to the portion of the wireless device implementing the second RAT.

According to some embodiments, the method further comprises: determining that a second portion of the system bandwidth is scheduled for communication between the serving cell and the wireless device, wherein the second portion of the system bandwidth comprises a different portion of the system bandwidth than the first portion of the system bandwidth; determining a second frequency range in active use by the wireless device for communication according to the first RAT based at least in part on the second portion of the system bandwidth being scheduled for communication between the serving cell and the wireless device; providing an indication of the second frequency range from the portion of the wireless device implementing the first RAT to the portion of the wireless device implementing the second RAT; and determining whether to modify operation of the wireless device with respect to the second RAT based at least in part on the indication of the second frequency range.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
    a non-transitory computer-readable memory medium storing program instructions; and
    first circuitry configured to implement a first radio access technology (RAT) in a wireless device, wherein the first circuitry is configured to execute the program instructions to cause the wireless device to:
       attach to a serving cell according to the first RAT, wherein the serving cell has a system bandwidth;
       determine a frequency range in active use by the wireless device for communication according to the first RAT, wherein the frequency range in active use by the wireless device for communication according to the first RAT comprises less bandwidth than the system bandwidth; and
       provide an indication of the first frequency range to second circuitry of the wireless device configured to implement a second RAT in the wireless device.

2. The apparatus of claim 1, wherein, to determine the frequency range in active use by the wireless device for communication according to the first RAT, the first circuitry is further configured to execute the program instructions to cause the wireless device to:
    receive information indicating a portion of the system bandwidth scheduled for communication between the serving cell and the wireless device,
    wherein the frequency range in active use by the wireless device for communication according to the first RAT is determined based at least in part on the portion of the system bandwidth scheduled for communication between the serving cell and the wireless device.

3. The apparatus of claim 2, wherein the frequency range in active use by the wireless device for communication according to the first RAT is determined further based at least in part on an expected potential interference level from the second RAT.

4. The apparatus of claim 2, wherein the frequency range in active use by the wireless device for communication according to the first RAT is determined further based at least in part on whether any activities in addition to the communication between the serving cell and the wireless device using the first portion of the system bandwidth are scheduled.

5. The apparatus of claim 1, wherein the first circuitry is further configured to execute the program instructions to cause the wireless device to:
provide an indication of an amount of time for which the frequency range in active use by the wireless device for communication according to the first RAT will be in active use by the wireless device for communication according to the first RAT to the second circuitry.

6. The apparatus of claim 1, wherein the first circuitry is further configured to execute the program instructions to cause the wireless device to:
provide an indication of a frequency hopping pattern in use by the wireless device for the first RAT to the second circuitry.

7. The apparatus of claim 1, wherein the first circuitry is further configured to execute the program instructions to cause the wireless device to:
provide an indication that the first frequency range is in active use for transmission according to the first RAT to the second circuitry.

8. The apparatus of claim 1, wherein the first circuitry is further configured to execute the program instructions to cause the wireless device to:
provide an indication that the first frequency range is in active use for reception according to the first RAT to the second circuitry.

9. A method, comprising:
by a wireless device:
attaching to a serving cell according to a first radio access technology (RAT), wherein the serving cell has a system bandwidth centered around a system center frequency;
determining a first portion of the system bandwidth scheduled for communication between the serving cell and the wireless device, wherein the first portion of the system bandwidth scheduled for communication between the serving cell and the wireless device comprises less bandwidth than the system bandwidth;
determining a first frequency range in active use by the wireless device for communication according to the first RAT based at least in part on the first portion of the system bandwidth being scheduled for communication between the serving cell and the wireless device;
providing an indication of the first frequency range from a portion of the wireless device implementing the first RAT to a portion of the wireless device implementing a second RAT; and
determining whether to modify operation of the wireless device with respect to the second RAT based at least in part on the indication of the first frequency range.

10. The method of claim 9, further comprising:
providing an indication of whether the first frequency range is in active use for transmission or reception by the wireless device according to the first RAT from the portion of the wireless device implementing the first RAT to the portion of the wireless device implementing the second RAT; and
determining whether to modify operation of the wireless device with respect to the second RAT further based at least in part on the indication of whether the first frequency range is in active use for transmission or reception by the wireless device according to the first RAT.

11. The method of claim 9, further comprising:
providing an indication of a frequency hopping pattern in use by the wireless device for the first RAT from the portion of the wireless device implementing the first RAT to the portion of the wireless device implementing the second RAT; and
determining whether to modify operation of the wireless device with respect to the second RAT further based at least in part on the indication of the frequency hopping pattern in use by the wireless device for the first RAT.

12. The method of claim 9, wherein determining the first frequency range further comprises:
determining an expected potential interference level from the second RAT; and
determining whether a larger frequency range than the first portion of the system bandwidth is in active use by the wireless device for communication according to the first RAT based at least in part on the expected potential interference level from the second RAT.

13. The method of claim 9, wherein determining the first frequency range further comprises:
determining whether any activities in addition to the communication between the serving cell and the wireless device using the first portion of the system bandwidth are scheduled; and
determining whether a larger frequency range than the first portion of the system bandwidth is in active use by the wireless device for communication according to the first RAT based at least in part on whether any activities in addition to the communication between the serving cell and the wireless device using the first portion of the system bandwidth are scheduled.

14. The method of claim 9, wherein the first portion of the system bandwidth is scheduled for communication between the serving cell and the wireless device for a first amount of time, wherein the method further comprises:
determining whether any activities in addition to the communication between the serving cell and the wireless device using the first portion of the system bandwidth are scheduled that require an additional amount of time;
determining an amount of time for which the first frequency range is in active use by the wireless device for communication according to the first RAT based at least in part on the first amount of time and whether any activities in addition to the communication between the serving cell and the wireless device using the first portion of the system bandwidth are scheduled that require an additional amount of time; and
providing an indication of the amount of time for which the first frequency range is in active use by the wireless device for communication according to the first RAT from the portion of the wireless device implementing the first RAT to the portion of the wireless device implementing the second RAT.

15. The method of claim 9, further comprising:
determining that a second portion of the system bandwidth is scheduled for communication between the serving cell and the wireless device, wherein the second portion of the system bandwidth comprises a different portion of the system bandwidth than the first portion of the system bandwidth;
determining a second frequency range in active use by the wireless device for communication according to the first RAT based at least in part on the second portion of the system bandwidth being scheduled for communication between the serving cell and the wireless device;
providing an indication of the second frequency range from the portion of the wireless device implementing the first RAT to the portion of the wireless device implementing the second RAT; and
determining whether to modify operation of the wireless device with respect to the second RAT based at least in part on the indication of the second frequency range.

16. A wireless device, comprising:
an antenna;
a radio coupled to the antenna; and
a processing element coupled to the radio;
wherein the wireless device is configured to:
  attach to a serving cell according to a first radio access technology (RAT), wherein the serving cell has a system bandwidth;
  determine a first frequency range in active use by the wireless device for communication according to the first RAT, wherein the first frequency range comprises less bandwidth than the system bandwidth;
  provide an indication of the first frequency range from a portion of the wireless device implementing the first RAT to a portion of the wireless device implementing a second RAT; and
  determine whether to modify operation of the wireless device with respect to the second RAT based at least in part on the indication of the first frequency range.

17. The wireless device of claim 16, wherein, to determine the first frequency range, the wireless device is further configured to:
  determine a portion of the system bandwidth scheduled for communication between the serving cell and the wireless device,
  wherein the first frequency range is determined based at least in part on the portion of the system bandwidth scheduled for communication between the serving cell and the wireless device.

18. The wireless device of claim 16, wherein, to determine whether to modify operation of the wireless device with respect to the second RAT, the wireless device is further configured to:
  determine whether a scheduled transmission according to the second RAT would cause interference to reception according to the first RAT based at least in part the indication of the first frequency range; and
  determine, if the scheduled transmission according to the second RAT would cause interference to reception according to the first RAT, to modify, for the scheduled transmission according to the second RAT, one or more of:
  a transmission frequency; a transmission time; or a transmission power.

19. The wireless device of claim 16, wherein the wireless device is further configured to:
  determine a first amount of time, comprising an amount of time for which the first frequency range is in active use by the wireless device for communication according to the first RAT; and
  provide an indication of the first amount of time from the portion of the wireless device implementing the first RAT to the portion of the wireless device implementing the second RAT.

20. The wireless device of claim 19, wherein, subsequent to the first amount of time, the wireless device is further configured to:
  determine a second frequency range in active use by the wireless device for communication according to the first RAT, wherein the second frequency range comprises less bandwidth than the system bandwidth, wherein the second frequency range comprises a different frequency range than the first frequency range;
  determine a second amount of time, comprising an amount of time for which the second frequency range is in active use by the wireless device for communication according to the first RAT;
  provide an indication of the second frequency range and the second amount of time from the portion of the wireless device implementing the first RAT to the portion of the wireless device implementing the second RAT; and
  determine whether to modify operation of the wireless device with respect to the second RAT for the second amount of time based at least in part on the indication of the second frequency range and the second amount of time.

* * * * *